United States Patent
Schmidt et al.

(10) Patent No.: US 8,980,999 B2
(45) Date of Patent: Mar. 17, 2015

(54) FUNCTIONAL MATERIALS HAVING A CONTROLLABLE VISCOSITY OR REVERSIBLE CROSSLINKING VIA AZA DIELS-ALDER REACTIONS WITH BISHYDRAZONES OR CONJUGATED BIS-SCHIFF BASES

(75) Inventors: Friedrich Georg Schmidt, Haltern am See (DE); Stefan Hilf, Rodenbach (DE); Christopher Barner-Kowollik, Stutensee (DE); Jiawen Zhou, Moers (DE)

(73) Assignee: Evonik Röhm GmbH, Darmstadt (DE)

( * ) Notice: Subject to any disclaimer, the term of this patent is extended or adjusted under 35 U.S.C. 154(b) by 57 days.

(21) Appl. No.: 13/820,621

(22) PCT Filed: Jul. 27, 2011

(86) PCT No.: PCT/EP2011/062857
§ 371 (c)(1),
(2), (4) Date: Mar. 4, 2013

(87) PCT Pub. No.: WO2012/031824
PCT Pub. Date: Mar. 15, 2012

(65) Prior Publication Data
US 2013/0172480 A1    Jul. 4, 2013

(30) Foreign Application Priority Data
Sep. 6, 2010    (DE) .......................... 10 2010 040 282

(51) Int. Cl.
*C08F 8/00*    (2006.01)
*C08L 33/12*    (2006.01)
(Continued)

(52) U.S. Cl.
CPC ... *C08F 8/00* (2013.01); *C08J 3/24* (2013.01); *C09D 5/26* (2013.01); *C08J 2400/10* (2013.01)

USPC ..... 524/560; 524/577; 525/330.5; 525/333.6; 525/186; 525/55; 525/188

(58) Field of Classification Search
CPC .......... C08F 8/00; C08F 120/10; C08L 33/12; C08L 76/04; C08L 45/00; C08L 81/00
USPC ............ 524/560, 577; 525/330.5, 333.6, 186, 525/55, 188
See application file for complete search history.

(56) References Cited

U.S. PATENT DOCUMENTS 6,512,051 B2 *    1/2003    Chino et al. ................... 525/203
2002/0086952 A1    7/2002    Chino et al.
(Continued)

FOREIGN PATENT DOCUMENTS

DE    199 02 484    7/1999

OTHER PUBLICATIONS

Inglis et al. "Ultrafast Click Conjugation of Macromolecular Building Blocks at Ambient Temperature", vol. 48, Issue 13, 2411-2414, Mar. 16, 2009.*
U.S. Appl. No. 13/988,147, filed May 17, 2013, Hilf, et al.
Syrett, J. et al., "Self-healing and self-mendable polymers," Polymer Chemistry, vol. 1, No. 7, pp. 978 to 987, (Jan. 1, 2010).
Sinnwell, S. et al., "Efficient Access to Multi-Arm Star Block Copolymers by a Combination of ATRP and RAFT-HDA Click Chemistry," Journal of Polymer Science Part A: Polymer Chemistry, vol. 47, No. 8, pp. 2207 to 2213, (Apr. 15, 2009).
(Continued)

*Primary Examiner* — Michael M Bernshteyn
(74) *Attorney, Agent, or Firm* — Oblon, McClelland, Maier & Neustadt, L.L.P.

(57) ABSTRACT

The present invention relates to innovative materials which are reversibly crosslinkable by means of a thermoreversible mechanism and/or whose viscosity is reversibly adjustable. Through the use of bishydrazones or conjugated bis-Schiff bases as diene components in aza-Diels-Alder reactions, functional materials are generated that feature controllable viscosity and/or reversible crosslinking.

15 Claims, 1 Drawing Sheet

(51) Int. Cl.
*C08F 120/10* (2006.01)
*C08L 45/00* (2006.01)
*C08J 3/24* (2006.01)
*C09D 5/26* (2006.01)

(56) References Cited

U.S. PATENT DOCUMENTS

2004/0014933 A1* 1/2004 Wudl et al. .................. 528/365
2012/0289657 A1 11/2012 Hilf et al.
2012/0309895 A1 12/2012 Schmidt et al.
2013/0323993 A1 12/2013 Schmitt et al.
2014/0163165 A1 6/2014 Schmidt et al.

OTHER PUBLICATIONS

Inglis, A. et al., "Ultrafast Click Conjugation of Macromolecular Building Blocks at Ambient Temperature," Angewandte Chemie International Edition, vol. 48, pp. 2411 to 2414, (2009).

International Search Report Issued Feb. 22, 2012 in PCT/EP11/62857 Filed Jul. 27, 2011.

U.S. Appl. No. 14/127,380, filed Dec. 18, 2013, Schmidt, et al.

U.S. Appl. No. 14/360,442, filed May 23, 2014, Schmidt, et al.

U.S. Appl. No. 14/363,055, filed Jun. 5, 2014, Schmidt, et al.

* cited by examiner

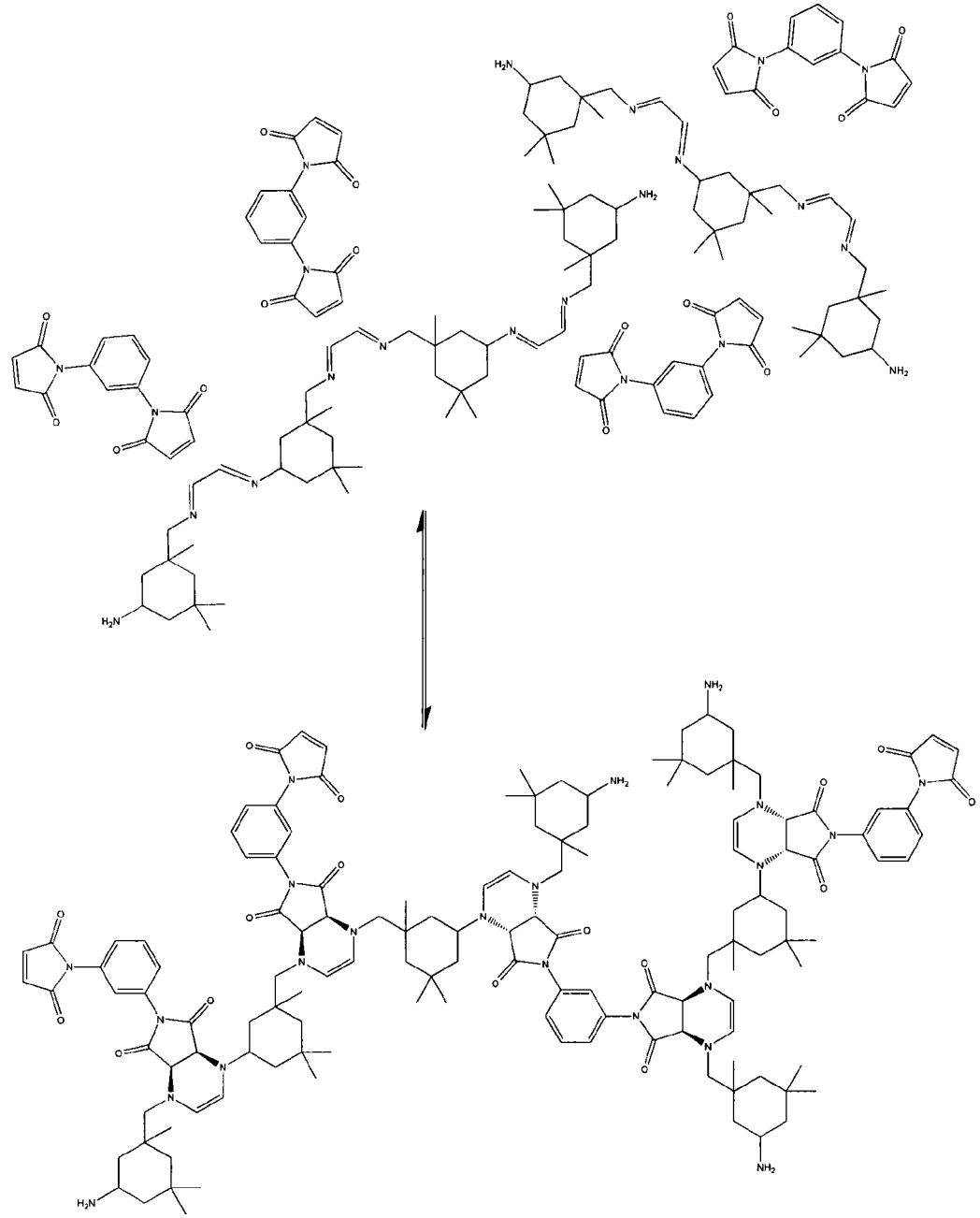

FUNCTIONAL MATERIALS HAVING A CONTROLLABLE VISCOSITY OR REVERSIBLE CROSSLINKING VIA AZA DIELS-ALDER REACTIONS WITH BISHYDRAZONES OR CONJUGATED BIS-SCHIFF BASES

The present invention relates to innovative materials which are reversibly crosslinkable by means of a thermoreversible mechanism and/or whose viscosity is reversibly adjustable. Through the use of bishydrazones or conjugated bis-Schiff bases as diene components in aza-Diels-Alder reactions, functional materials are generated that feature controllable viscosity and/or reversible crosslinking.

PRIOR ART

Methods for the reversible crosslinking of polymers are of great interest for a broad field of applications. In adhesive applications, for example, diverse possibilities for the automobile industry or the semiconductors industry are described. In the context of the construction of machines, precision mechanical devices, or in the construction industry as well, however, such adhesives are of interest. Besides adhesive applications, reversibly crosslinkable polymers may also be of interest in sealants, in coating materials such as varnishes or paints, or in the production of moldings.

DE 198 32 629 and DE 199 61 940 describe processes where epoxy-, urea-, (meth)acrylate- or isocyanate-based adhesives are thermally decomposed. For this purpose, the adhesive formulation from DE 199 61 940 comprises a thermally unstable substance which is activated on heating. The adhesive layer in DE 198 32 629 is destroyed by a particularly high energy input. In both cases, deactivation of the adhesive layer is irreversible.

US 2005/0159521 and US 2009/0090461 describe an adhesive system which is crosslinked radically by exposure to actinic radiation and is destroyed by ultrasound. This process too, irreversibly, can no longer be implemented after one bonding cycle.

In EP 2 062 926, thermally labile, sterically hindered urea groups are incorporated in the chains of a polyurethane for adhesive applications; introduction of thermal energy causes destruction thereof, thereby reducing the adhesive bonding effect sufficiently to part the bond.

US 2009/0280330 describes an adhesive system which can apparently be used more than once and which has a two-layer construction. One layer is a shape memory layer, which may be thermally flexible or cured. The other layer is a dry adhesive, having different adhesive strengths as a function of its structure. Problems of such a system, however, are the two-layer structure, which is laborious to construct, and the anticipated residual tack after heating of the shape memory layer.

For a number of years, primarily within academia, methods for constructing block copolymers have been researched under the generic heading of "click chemistry". In this chemistry, two different homopolymers with linkable end groups are combined with one another and are joined to one another by means, for example, of a Diels-Alder reaction, Diels-Alder-analogous reaction or another cycloaddition. The objective of this reaction is to construct thermally stable, linear, and possibly high molecular mass polymer chains. Inglis et al. (Macromolecules 2010, 43, pp. 33-36), for example, describe, for this purpose, polymers with cyclopentadienyl end groups which are obtainable from polymers prepared by means of ATRP. These cyclopentadiene groups are able to react very rapidly in hetero-Diels-Alder reactions with polymers which carry electron-deficient dithioesters as end groups (Inglis et al., Angew. Chem. Int. Ed. 2009, 48, pp. 2411-2414).

The use of monofunctional RAFT polymers for linking with monofunctional polymers having a dihydrothiopyran group by way of a hetero-Diels-Alder reaction is found in Sinnwell et al. (Chem. Comm. 2008, 2052-2054). This method can be used to realize AB diblock copolymers. Rapid variants of this hetero-Diels-Alder linkage for the synthesis of AB block copolymers with a dithioester group which is present after a RAFT polymerization and with a dienyl end group are described in Inglis et al. (Angew. Chem. Int. Ed. 2009, 48, pp. 2411-14) and in Inglis et al. (Macromol. Rapid Commun. 2009, 30, pp. 1792-98). The analogous preparation of multiarm star polymers is found in Sinnwell et al. (J. Pol. Sci.: Part A: Pol. Chem. 2009, 47, pp. 2207-13).

U.S. Pat. No. 6,933,361 describes a system for producing transparent moldings that can be repaired simply. The system is composed of two polyfunctional monomers which polymerize by means of a Diels-Alder reaction to form a highly dense network. One functionality in this system is a maleimide and the other functionality is a furan. The thermal switching of a highly dense network of this kind is used for its repair. Crosslinking takes place at temperatures above 100° C. The partial reverse reaction at even higher temperatures.

In Syrett et al. (Polym. Chem. 2010, DOI: 10.1039/b9py00316a), star polymers are described for use as flow improvers in oils. These polymers have self-healing properties that can be controlled by means of a reversible Diels-Alder reaction. For this purpose, monofunctional polymethacrylate arms are combined with polymethacrylates which in the middle of the chain, as a fragment of the initiator used, possess a group which can be used in a reversible Diels-Alder reaction.

The patent application filed with the German Patent and Trademark Office on Feb. 16, 2010, and bearing the number 102010001987.9 discloses crosslinkable systems which exhibit a thermoreversible crosslinking mechanism on the basis of a Diels-Alder or hetero-Diels-Alder reaction. German patent application 102010001992.5, filed on the same date, discloses analogous systems which, by means of the same thermoreversible mechanism, exhibit a controllable viscosity. Both patent applications are confined primarily to systems where the dienophile has a carbon-sulfur double bond. In both cases, moreover, the systems described are only systems which comprise at least one polymeric component which derives from a controlled radical polymerization.

OBJECT

An object of the present invention is to provide a new reversible, more particularly thermoreversible coupling or crosslinking method which can be used in different applications and across a broad formulation spectrum.

The object, furthermore, was to provide a reversible coupling or crosslinking method which can be used for a broad spectrum of binders.

A particular object is to provide a reversible crosslinking method which can be switched a number of times, i.e., at least five times, without great loss of properties.

Furthermore, the object exists of providing a reversible crosslinking method which can be activated very rapidly at low temperatures and can be deactivated again under conditions which are benign for the formulation and any coated substrates.

Further objects, not stated explicitly, will become apparent from the overall context of the description, claims, and examples hereinbelow.

SOLUTION

The objects have been achieved through development of an innovative reversible crosslinking mechanism which can be used for different kinds of polymers independently of the formulating constituents such as binders. With the mechanism, new, reversibly crosslinkable formulations are also provided. Surprisingly it has been found that the stated objects can be achieved by means of a formulation which is crosslinkable by means of an aza-Diels-Alder reaction.

The objects have been achieved in particular through the provision of an innovative formulation which comprises a component A, which has at least two dienophilic double bonds, and a component B, which has at least two diene functionalities. Component B has at least one diene functionality which is composed of in each case two carbon-nitrogen double bonds. Preferably all diene functionalities reactable by means of an aza-Diels-Alder reaction have two carbon-nitrogen double bonds.

This innovative, inventive formulation can be coupled or crosslinked at room temperature. At the same time, the coupling or crosslinking can be reversed to an extent of at least 50% at a higher temperature.

Coupling for the purposes of the invention means a mechanism by which the viscosity of a formulation is reversibly switchable. The switching of the invention is accomplished through the reaction of two polymers and/or oligomers and/or low molecular mass compounds, in each case difunctional, to form polymer chains of higher molecular mass under a first condition, such as a first, lower temperature, for example. The switching of the invention further embraces the undoing of these reaction sites under a second condition, such as a second, higher temperature, for example.

Crosslinking for the purposes of the invention means a mechanism by which a formulation is reversibly crosslinkable. The crosslinking of the invention is accomplished through the reaction of two polymers and/or oligomers and/or low molecular mass compounds, each of which is at least difunctional to give a crosslinked polymer, under a first condition, such as a first, lower temperature, for example. The switching of the invention further embraces the undoing of these coupling sites under a second condition, such as a second, higher temperature, for example. In the case of a formulation for reversible crosslinking, at least one of these two components, A or B, has more than two functionalities.

In one preferred embodiment at least one of the components, A or B, is present in the form of a polymer. An advantage of the present invention is that these polymers are freely selectable. The polymers are preferably polyacrylates, polymethacrylates, polystyrenes, copolymers of acrylates, methacrylates and/or styrenes, polyacrylonitrile, polyethers, polyesters, polylactic acids, polyamides, polyesteramides, polyurethanes, polycarbonates, amorphous or partially crystalline poly-α-olefins, EPDM, EPM, hydrogenated or unhydrogenated polybutadienes, ABS, SBR, polysiloxanes and/or block, comb and/or star copolymers of these polymers. With particular preference the polymer is a poly(meth)acrylate or a polystyrene.

In one particular embodiment these particularly preferred polymers have been prepared by means of a controlled radical polymerization. This is more particularly a polymerization process according to Atom Transfer Radical Polymerization (ATRP), Nitroxide Mediated Polymerization (NMP) or Reversible Addition Fragmentation Chain Transfer Polymerization (RAFT) method.

By way of example of the embodiment where component B is a difunctional polymer prepared by means of ATRP, the functionalization with diene groups may take place by a polymer-analogous reaction or by a substitution which is carried out during termination. This substitution may be achieved, for example, by addition of mercaptans functionalized with diene groups.

The (meth)acrylates notation used below stands for alkyl esters of acrylic acid and/or of methacrylic acid.

In one particular embodiment both components, A and B, are each a polymer. Where components A and B are each polymer, these polymers may be different polymers or the same polymers, differing only in respect of the functional groups.

Compounds used as dienes in accordance with the invention are those in which at least one diene group, preferably two diene groups, and more preferably all diene groups, are groups having two conjugated carbon-nitrogen double bonds.

Preferably in this case there are two embodiments. In the first embodiment the diene functionality is a bishydrazone. The structure of bishydrazones is as follows:

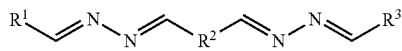

Here, $R^1$ and $R^3$ are identical or different groups. These groups may be hydrogen, a hydroxyl, amine, mercapto, or silyl group, or a hydrocarbon radical. The hydrocarbon radical may be linear, partly cyclic, or branched. Furthermore, the hydrocarbon radical may maintain unsaturated groups or aromatic groups, or may consist entirely of aromatic groups. The hydrocarbon radical, furthermore, may have additional functional groups.

$R^2$ is a divalent, linear, branched, cyclic or partly cyclic hydrocarbon group, which may have or contain further unsaturated or aromatic groups and also functional substituents.

Such compounds may be synthesized from diketones, dialdehydes or glyoxal and hydrazine. In the case of the product of glyoxal and hydrazine, not only hydrazone groups but also Schiff bases are formed, and they may compete with one another, with both groups being in accordance with the invention:

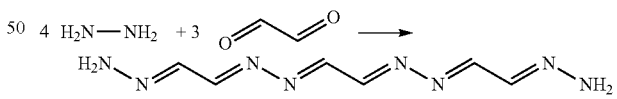

More illustrative, for example, is the synthesis from glutaraldehyde and hydrazine:

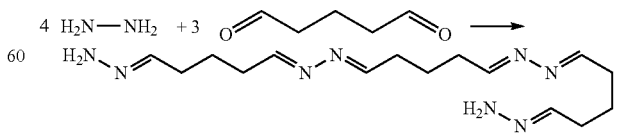

Details relating the synthesis of the bishydrazones is found by the skilled person in Goldin et al. (Vyssokomolekulyarny Soedniniya Ser.B, 1975, 17(6), pp. 463-5).

In an embodiment where the diene is an oligomeric or polymeric compound, in one possible embodiment one of the groups $R^1$, $R^2$, or $R^3$ is bonded to an oligomer or polymer. In an alternative embodiment to this, the diene groups are bonded spatially separately from one another to the polymer or oligomer. An embodiment of this kind may have the following appearance, for example:

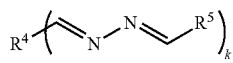

Here the group $R^4$ is the polymer or oligomer. Possibilities for $R^5$ are the same groups already listed for $R^1$ and $R^3$. If the groups in question are oligomers or polymers, they are preferably only monovalent. k is a number greater than or equal to 2, preferably greater than or equal to two and less than 10.

In the case of the second alternative embodiment, the diene functionalities are bis-Schiff bases. Bis-Schiff bases have the following functionality:

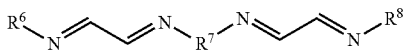

Here, $R^6$ and $R^8$ are identical or different groups. These groups may be hydrogen, a hydroxyl, amine, mercapto, or silyl group, or a hydrocarbon radical. The hydrocarbon radical may be linear, partly cyclic, or branched. Furthermore, the hydrocarbon radical may contain unsaturated or aromatic groups, or may consist entirely of aromatic groups. The hydrocarbon radical, furthermore, may have additional functional groups.

$R^7$ is a divalent, linear, branched, cyclic or partly cyclic hydrocarbon group, which may have or contain further unsaturated or aromatic groups and also functional substituents.

Such compounds are synthesized from glyoxal or vicinal diketones and from amines having a functionality of two, three, or more. One example of such a synthesis is the reaction of glyoxal with isophoronediamine (IPD):

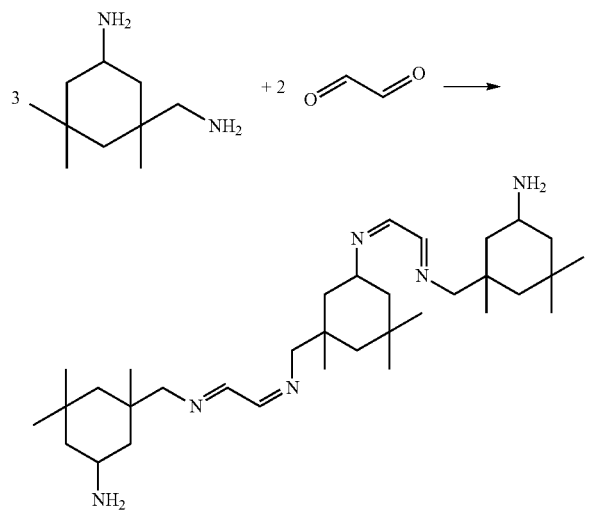

In an embodiment in which this diene is an oligomeric or polymeric compound, in one possible embodiment, one of the groups $R^6$, $R^7$, or $R^8$ is bonded to an oligomer or polymer. In an alternative embodiment to this, the diene groups are bonded spatially separately from one another to the polymer or oligomer. The appearance of such an embodiment may be, for example, as follows:

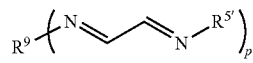

Here, the group $R^9$ is the polymer or oligomer.

Possibilities for $R^{5'}$ are the same groups as already listed for $R^1$ and $R^3$. If these groups are oligomers or polymers, they are preferably only monovalent. p is a number greater than or equal to 2, preferably greater than or equal to two and less than 10.

The difunctional and multifunctional dienophiles used may be different kinds of substances. As already observed, they may be low molecular mass compounds, oligomers, or polymers. In the two latter cases, the dienophilic groups may be bonded at chain ends or as substituents on the oligomer or polymer chain. In the case of crosslinking systems with dienophilically substituted oligomers or polymers which have a functionality of more than 2, different chains may also have different degrees of functionalization. In such an event, an average degree of functionalization is stated.

The dienophilically substituted oligomers or polymers may have been realized by means of a variety of methods: In the case of the monomer method, functional monomers—containing a dienophilic substituent—are copolymerized. In the case of the endcapping method, a polymerization is terminated by means of a suitable substituted compound. In this way, one chain end becomes substituted. The second substituted chain end may be realized, for example, by using a substituted initiator or a difunctional initiator. In the case of the method of a polymer-analogous reaction, functional groups are reacted either at the chain ends or on the chain with a compound containing a group which is reactive with the functionality on the polymer and containing a second, dienophilic group.

Dienophilic groups for an aza-Diels-Alder reaction are common knowledge from the literature. An example of dienophiles having a carbon-carbon double bond are maleimidenes. An example of a low molecular mass difunctional dienophile is p-benzenebismaleimide, which is available commercially under the product name COMPIMIDE© from the company EVONIK Technochemie GmbH.

Also possible is the use of dienophiles known from the chemistry of the hetero-Diels-Alder reaction, such as imines, ketones, or aldehydes with conjugated substitution by electron-withdrawing groups.

In one particular embodiment the dienophile is a compound having a carbon-sulfur double bond. Besides the thioketones that are common knowledge, this compound may alternatively be a dithioester. In such a case the dienophile is preferably a compound having the structure

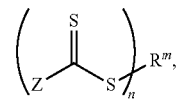

where Z is a strongly electron-withdrawing group, $R^m$ is a polyvalent organic group, preferably based on branched or linear alkylic, aromatic or a combination of alkylic and aromatic polyfunctional alcohols, polyfunctional halogenated compounds, polyfunctional carboxylic acids, or polyfunctional amines. Alternatively R''' may also be a polymer. The number of dithioester groups n is a number between 2 and 20, preferably between 2 and 10, and more preferably between 2 and 4.

In one embodiment the group Z is a 2-pyridyl group, a phosphoryl group, or a sulfonyl group. Also contemplated are cyano or trifluoromethyl groups, and also any other group Z which very strongly reduces the electron density of the C=S double bond and hence allows a rapid Diels-Alder reaction. Details relating to this embodiment may be derived from German patent applications DE 102010001987.9 and DE 102010001992.5.

Surprisingly it has been found that these systems crosslink very rapidly even at room temperature, with optional addition of a crosslinking catalyst. Equally surprisingly it has been found that these networks can be returned into a thermoplastic again, simply and almost completely, even at very low temperatures of, for example, somewhat over 80° C. Moreover, it has been found, very surprisingly, that further crosslinking can take place thereafter, without further addition of crosslinker and/or catalyst, as for example by pure cooling. Furthermore, it is a particularly surprising effect that these cycles of crosslinking and conversion back into a thermoplastic can be carried out at least three times, preferably at least five times, without substantial loss of properties of the network.

A further aspect of the present invention is the process for reversible coupling or crosslinking. When this process is implemented, a formulation composed of at least two different components A and B is crosslinked at room temperature by means of an aza-Diels-Alder reaction, with the diene partaking in the aza-Diels-Alder possessing two carbon-nitrogen double bonds. In a second process step, at a higher temperature, at least 500, preferably at least 900, and more preferably at least 99% of the crosslinks are undone again by means a retro-aza-Diels-Alder reaction.

When this second process step is carried out, in the case of a system crosslinked after the first process step, at a temperature above 80° C., preferably within 5 minutes, not more than within 10 minutes, at least 90%, preferably at least 95%, and more preferably at least 98% by weight of the formulation becomes soluble again in a solvent suitable for the formulation prior to crosslinking. The crosslinking beforehand was such that, on 5-minute washing with the same solvent, not more than 5%, preferably not more than 2%, and more preferably not more than 1% by weight of the formulation could be dissolved.

The expression "formulation" and all of the percentages associated with it relate in this case only to components A and B. Further formulating constituents, such as those, for example, which may be added in a coating or adhesive composition, are disregarded in this consideration. In the text below, the expression "formulation" in the context of this specification describes exclusively the components A and B and also an optional crosslinking catalyst. The expression "composition", in contrast, embraces components added additionally as well as the formulation. These additional components may be adjuvants selected specifically for the particular application, such as fillers, pigments, additives, compatibilizers, co-binders, plasticizers, impact modifiers, thickeners, defoamers, dispersing additives, rheology improvers, adhesion promoters, scratch resistance additives, catalysts or stabilizers, for example.

In accordance with the formulation already described, first components A and B, and optional further adjuvants, are combined in the process. Components A and/or B comprise at least one polymer from the list given earlier on above.

The coupling or crosslinking reaction may take place at room temperature within 10 minutes, preferably within 5 minutes, more preferably within 2 minutes, and very preferably within one minute. In order to accelerate the coupling or crosslinking it is possible to add a catalyst after components A and B have been mixed, this catalyst being referred to hereinafter as crosslinking catalyst, without thereby restricting the invention to crosslinking systems. These crosslinking catalysts are generally strong acids such as trifluoroacetic acid or sulfuric acid, or strong Lewis acids such as boron trifluoride, zinc dichloride, titanium dichloride diisopropoxide, or aluminum trichloride, for example. When a crosslinking catalyst of this kind is used, crosslinking takes place within 8 minutes, preferably within 5 minutes, more preferably within 2 minutes after the mixing of components A and B with the crosslinking catalyst.

In one alternative embodiment, coupling or crosslinking may also be accelerated without a catalyst, by thermal means, for example. In that case the activation temperature is below the temperature needed for the retro-(aza)-Diels-Alder reaction.

In another alternative embodiment, the formulation, independently of the activation of the crosslinking reaction, comprises a further catalyst that lowers the activation temperature of the retro-aza-Diels-Alder reaction. These catalysts may be, for example, iron or an iron compound.

The formulations and processes of the invention can be used in a wide variety of fields of application. The list below indicates certain preferred fields of application by way of example, without confining the invention in this respect in any form whatsoever. Such preferred fields of application are adhesives, sealants, molding compounds, varnishes, paint, coatings, composite materials, or inks.

These inks are, for example, compositions which are applied thermally and crosslink on the substrate. If conductive oligomers are used or additives for generating conductivity in general, an electrically conducting ink is obtained which can be processed, for example, by bubble-jet methods. Examples from the fields of application of varnishes, coatings, and paint are compositions which in the decrosslinked state are able to wet porous materials, for example, to particularly good effect and which, following the crosslinking reaction, produce highly cohesive materials.

Similar characteristics are of importance for adhesives, which ought to have high cohesion and are nevertheless intended readily to wet the surfaces of the materials to be bonded. A further application in the adhesive bonding area is, for example, a join which is needed only temporarily and must later be undone, of the kind that may occur in various production operations, for example, in automotive engineering or in mechanical engineering.

Another conceivable application is the bonding of components which, viewed over the lifetime of the product as a whole, are highly likely to be replaced, and which therefore ought to be removable again very easily and without residue. One example of an application of this kind is the bonding of automobile windshields.

One particular example of adhesives or sealants is their used in food packaging which opens or can be undone autonomically during heating, such as in a microwave, for example.

Examples of applications in the rapid prototyping sector for the crosslinking and decrosslinking materials described herein can be found in the area of FDM (fused deposition modeling) or in 3D printing by ink-jet methods with low-viscosity melts. Also possible, though, is application in other rapid prototyping techniques.

Shown by way of example in FIG. 1, for the purpose of illustration, is the crosslinking reaction between a total of 5 p-benzenebismaleimides, a trifunctional and a bifunctional Schiff base.

The invention claimed is:

1. A formulation, comprising:
    a component A comprising at least two dienophilic double bonds, and
    a component B comprising at least two diene functionalities, wherein at least one of the diene functionalities comprises two carbon-nitrogen double bonds,
    wherein
    the formulation is crosslinkable via an aza-Diels-Alder reaction, and couplable or crosslinkable at room temperature, and
    a coupling or crosslinking in the formulation is reversible to an extent of at least 50% at a temperature of at least 80° C.

2. The formulation according to claim 1, wherein all the diene functionalities comprise two carbon-nitrogen double bonds.

3. The formulation according to claim 1, wherein at least one of the components A and B comprises more than two functionalities.

4. The formulation according to claim 1, wherein at least one of the components A, and B, or both is a polymer.

5. The formulation according to claim 1, wherein the diene functionality is a bishydrazone.

6. The formulation according to claim 1, wherein the diene functionality is a bis-Schiff base.

7. The formulation according to claim 1, wherein each of the component A and the component B are polymers where the polymers thereof are identical or different.

8. The formulation according to claim 4, wherein the polymer of the component A, B or both is at least one polymer selected from the group consisting of a polyacrylate; a polymethacrylate; polystyrene; a copolymer of acrylates, methacrylates or styrene; polyacrylonitrile; a polyether; a polyester; a polylactic acid; a polyamide; a polyesteramide; a polyurethane; polycarbonate; an amorphous or a partially crystalline poly-α-olefin; EPDM; EPM; a hydrogenated or an unhydrogenated polybutadiene; ABS; SBR; a polysiloxane; and a block, comb or star copolymer of these polymers.

9. The formulation according to claim 8,
    wherein the polymer is a poly(meth)acrylate or polystyrene, and
    the polymer is prepared by ATRP, NMP or RAFT.

10. A process for reversible crosslinking, the process comprising: crosslinking the formulation according to claim 1.

11. The process according to claim 10, wherein, at a temperature above 80° C., at least 90% of the formulation is soluble in a solvent in which the formulation prior to crosslinking is soluble.

12. The process according to claim 10, wherein each of the component A and the component B are polymers where the polymers thereof are identical or different.

13. The process according to claim 10, wherein said crosslinking takes place within 2 minutes after a mixing of the components A and B.

14. The process according to claim 10, wherein said crosslinking takes place within 2 minutes after a mixing of the components A and B with a crosslinking catalyst.

15. An article comprising the formulation according to claim 1,
    wherein the article is an adhesive, a sealant, a molding compound, a varnish, a paint, a coating, an ink, or a composite material.

* * * * *